United States Patent [19]

Kozak

[11] Patent Number: 5,450,776
[45] Date of Patent: Sep. 19, 1995

[54] SECURITY FASTENER REMOVAL TOOL

[76] Inventor: Burton Kozak, 1300 N. Lake Shore Dr., #28C, Chicago, Ill. 60610

[21] Appl. No.: 389,733

[22] Filed: Feb. 15, 1995

Related U.S. Application Data

[63] Continuation of Ser. No. 167,522, Dec. 15, 1993, abandoned.

[51] Int. Cl.$^6$ .............................................. B25B 23/08
[52] U.S. Cl. ....................................... 81/451; 81/461; 81/125
[58] Field of Search ............... 81/461, 441, 451, 452, 81/460, 176.1, 176.15, 176.2, 125, 53.2

[56] References Cited

U.S. PATENT DOCUMENTS

| | | | |
|---|---|---|---|
| 673,056 | 4/1901 | Jacobs ................ | 81/461 X |
| 1,129,049 | 2/1915 | Smith .................. | 81/461 X |
| 2,103,944 | 12/1937 | Gullborg . | |
| 3,517,714 | 6/1970 | Desbarats ............ | 81/451 |
| 3,590,235 | 6/1971 | Leo et al. . | |
| 3,678,789 | 7/1972 | Wilson . | |
| 3,739,825 | 6/1973 | Knox ................... | 81/451 |
| 4,429,599 | 2/1984 | LaSante, Sr. . | |
| 4,569,259 | 2/1986 | Rubin et al. . | |
| 4,800,787 | 1/1989 | Cerny . | |
| 4,947,712 | 8/1990 | Brosnan .............. | 81/53.2 |

*Primary Examiner*—D. S. Meislin
*Attorney, Agent, or Firm*—Marshall, O'Toole, Gerstein, Murray & Borun

[57] ABSTRACT

In order to remove a one-way fastener of the type having a generally circular head with a flat upper surface portion and a convex upper surface portion, a security fastener removal tool is disclosed. The tool includes a shank having an end to be placed in engagement with the head of the one-way fastener. The end of the shank has a pair of fastener-engaging tips extending therefrom for mating engagement with a corresponding pair of tip-receiving recesses in the head of the one-way fastener. The tool also includes a generally cylindrical collar which is disposed so as to fully surround the pair of fastener-engaging tips. With this arrangement, the collar has an inner surface diameter substantially the same as the fastener head outer diameter, and the inner surface of the collar is adapted to grip the head of the one-way fastener.

16 Claims, 1 Drawing Sheet

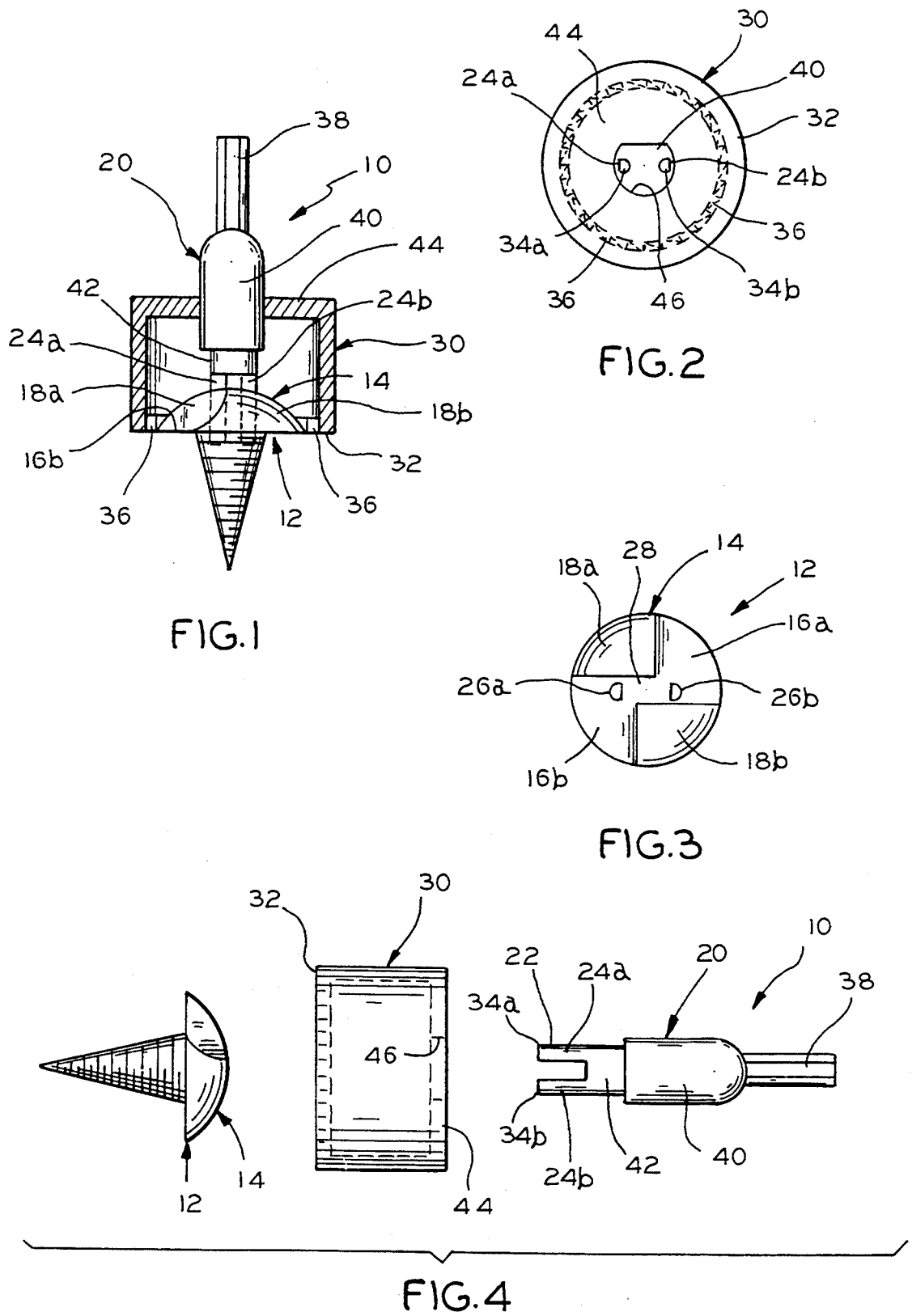

SECURITY FASTENER REMOVAL TOOL

This is a Rule 62 file wrapper continuation of U.S. application Ser. No. 08/167,522, filed Dec. 15, 1993, now abandoned.

FIELD OF THE INVENTION

The present invention is generally related to fastener removing tools, and, more particularly, a tool for removing a one-way fastener of the security fastener type.

BACKGROUND OF THE INVENTION

Security fasteners which are tamper-resistant or vandal-resistant are now well known. These fasteners typically have tamper-proof screw heads wherein the screw heads are adapted to be driven in a clockwise direction utilizing a conventional screwdriving blade, and they are typically adapted to remain in a fully-installed condition without being able to be removed by further use of a conventional screwdriver blade when operated in a counterclockwise direction. However, security fasteners must occasionally be removed by authorized personnel.

In connection with a typical screw of the security type, it has a generally circular head with both flat and convex upper surface portions. It may also typically include a corresponding pair of tip-receiving recesses in the head thereof. While such a security fastener can be installed with a conventional screwdriver, there is a need for a special tool for removal thereof.

Over the years, there have been a variety of different proposals for tools to accomplish this particular objective. Among the various proposals are the tools which are disclosed in Gullborg, U.S. Pat. No. 2,103,944; Cerny, U.S. Pat. No. 4,800,787; and La Sante, Sr., U.S. Pat. No. 4,429,599. Unfortunately, each of these tools requires a specially-designed fastener which renders them less than desirable for any existing fastener applications.

More specifically, there would be a natural reluctance to utilize any of the tools which have been suggested in these earlier patents. They would not only be unsuitable for removing existing types of security fasteners, but, equally important, they would require a substantial capital investment inasmuch as specially-designed screws would need to be manufactured and marketed. Clearly, the Gullborg '944 patent, Cerny '787 patent, and La Sante, Sr. '599 patent have failed to meet the need for a unique security fastener removal tool.

The present invention is directed to overcoming one or more of the foregoing problems and achieving one or more of the resulting objects.

SUMMARY OF THE INVENTION

It is, therefore, a principal object of the present invention to provide a unique improved removal tool for use in removing the most commonly utilized security fasteners. It is a further object of the present invention to provide a tool for removing a one-way fastener of the type generally in widespread use to accommodate ease of removal of existing installed fasteners of this particular type. It is an additional object of the present invention to provide a tool for removing a fastener having a pair of both flat and convex head surface portions thereon.

Accordingly, the present invention is directed to a tool which is adapted for removing a one-way fastener of the type which has a generally circular head with a flat upper head surface portion and a convex upper head surface portion thereon. The tool includes a shank having an end to be placed in engagement with the head of the one-way fastener. The end of the shank has a pair of fastener-engaging tips extending therefrom for mating engagement with a corresponding pair of tip-receiving recesses in the head of the fastener. The tool also includes a cylindrical collar surrounding the pair of fastener-engaging tips at the end of the shank. With this arrangement, the collar has an inner surface diameter substantially the same as the outer diameter of the generally circular head, and means are associated with the inner surface of the collar for gripping the head of the one-way fastener.

In the exemplary embodiment, the fastener-engaging tips and the tip-receiving recesses have mating non-circular cross-sections. It is also advantageous for the fastener-engaging tips and the generally cylindrical collar to be integral with the one end of the shank. The gripping means preferably includes a plurality of continuous serrations about the inner surface of the cylindrical collar. It is further advantageous for the shank to have an end opposite the fastener-engagement end to be driven by a rotary tool for removing the one-way fastener. Alternatively, the cylindrical collar may be detachably securable to the fastener-engagement end of the shank to surround the tips upon demand.

With this understanding, the one-way fastener preferably has a pair of flat upper surface portions and a pair of convex upper surface portions. These respective surface portions are advantageously located generally in diametrically opposite quadrants. Still additionally, the tip-receiving recesses are preferably located along a flat surface diameter portion of the head.

More specifically, the tip-receiving recesses are advantageously symmetrically arranged in the head of the one-way fastener. The flat surface diameter portion of the head is then preferably located to divide one flat upper surface portion and adjacent convex upper surface portion from the other flat upper surface portion and adjacent convex upper surface portion. With this arrangement, the tool of the present invention is exceptionally well suited to successfully accomplish its intended function.

In a highly preferred embodiment, the end of the shank is formed so as to have a pair of essentially symmetrically arranged fastener-engaging tips extending therefrom. It is also advantageous for the generally cylindrical collar to have a lowermost peripheral edge generally coextensive with the lowermost ends of the fastener-engaging tips and an inner depth at least as great as the maximum height of the generally circular head of the one-way fastener. As for the plurality of continuous serrations, they are preferably angled to bite into the head of the one-way fastener when the shank is driven counterclockwise.

Still additional details include the shank being hexagonal shaped at the end which is to be driven by the rotary tool. It may then advantageously have a generally cylindrical intermediate portion, and the fastener-engaging tips may comprise prongs extending from an extension of the generally cylindrical intermediate portion of the shank. Furthermore, the extension may be non-circular in cross-section and smaller than the intermediate portion to form a shoulder therebetween.

With this arrangement, the generally cylindrical collar advantageously has a cap with an opening adapted to mate with the non-circular cross-section opposite the serrations for driving the collar when the hexagonal shaped end of the shank is driven by a rotary tool.

Other objects, advantages and features of the present invention will become apparent from a consideration of the following specification taken in conjunction with the accompanying drawings.

BRIEF DESCRIPTION OF THE DRAWINGS

FIG. 1 is a view partially in section of a security fastener removal tool in accordance with the present invention;

FIG. 2 is an end elevational view of the tool illustrated in FIG. 1;

FIG. 3 is a top plan view of a security fastener to be removed with the tool of FIG. 1; and FIG. 4 is a perspective view of the tool illustrated in FIG. 1.

DETAILED DESCRIPTION OF THE PREFERRED EMBODIMENT

In the illustrations given, and with reference first to FIG. 1, the reference numeral 10 designates generally a tool for removing a one-way fastener 12 of a basically conventional type. The fastener 12 will be seen to be of the type having a generally circular head 14 with a pair of flat upper head surface portions 16a and 16b and a pair of convex upper head surface portions 18a and 18b. As will be appreciated from FIG. 3, the respective flat upper head surface portions 16a and 16b and convex upper head surface portions 18a and 18b are located generally in diametrically opposite quadrants.

Referring to FIGS. 1 and 4, the tool 10 includes a shank 20 having an end 22 to be placed in engagement with the head 14 of the one-way fastener 12 which has a pair of symmetrically arranged fastener-engaging tips 24a and 24b extending therefrom. The tips 24a and 24b are adapted for mating engagement with a corresponding pair of symmetrically arranged tip-receiving recesses 26a and 26b in the head 14 of the one-way fastener 12. The tip-receiving recesses 26a and 26b are located along a flat surface diameter portion 28 of the head 14 dividing one flat upper surface portion 16a and adjacent convex upper surface portion 18a from the other flat upper surface portion 16b and adjacent convex upper surface portion 18b. The end 22 of the shank 20 also has a generally cylindrical collar 30 surrounding the symmetrically arranged fastener-engaging tips 24a and 24b with an inner surface of the generally cylindrical collar 30 having a diameter substantially the same as the outer diameter of the generally circular head 14. As best shown in FIGS. 1 and 4, the generally cylindrical collar 30 will also be seen to have a lowermost peripheral edge 32 which is generally axially coextensive with the lowermost ends 34a and 34b of the fastener-engaging tips 24a and 24b.

Referring specifically to FIG. 1, the generally cylindrical collar 30 will be seen to have an inner depth at least as great as the maximum height of the generally circular head 14 of the one-way fastener 12. It will also be apparent by comparing FIGS. 1 and 2 that the generally cylindrical collar 30 includes means associated with the inner surface of the collar for gripping the head 14 of the one-way fastener. More specifically, and referring to the drawings, the gripping means suitably includes a plurality of continuous serrations 36 entirely about the inner surface of the generally cylindrical collar 30.

As shown in FIGS. 1 and 4, the shank 20 also has an end 38 opposite the fastener-engagement end 22 to be driven by a rotary tool for removing the one-way fastener 12. It will be appreciated that the shank 20 is advantageously hexagonal shaped at the end 38 to be driven by the rotary tool, and, in the illustrated embodiment, has a generally cylindrical intermediate portion 40. As also shown in FIGS. 1 and 4, the fastener-engaging tips 24a and 24b comprise prongs which extend from an extension 42 of the generally cylindrical intermediate portion 40.

In the illustrated embodiment, the fastener-engaging tips 24a and 24b and the tip-receiving recesses 26a and 26b are both formed so as to have mating non-circular cross-sections. These may advantageously be generally D-shaped cross-sections, as illustrated, although other cross-sections of a non-circular nature are also acceptable. As for the continuous serrations 36, FIG. 2 illustrates that they are specifically angled so as to bite into the head 14 of the one-way fastener 12 whenever the shank 20 is driven counterclockwise.

As will be appreciated from FIGS. 2 and 4, the extension 42 is non-circular in cross-section and smaller than the intermediate portion 40 to form a shoulder at the point between the extension 42 and the intermediate portion 40. With this construction, the generally cylindrical collar 40 will be seen to have a cap or end 44 which has an opening 46 that is adapted to mate with the non-circular cross-section of the extension 42 opposite the serrations 36.

In other words, the non-circular mating cross-sections suitably comprise means for detachably securing the generally cylindrical collar 30 to the fastener-engagement end 42 of the shank 20. Alternatively, and as will be appreciated by those skilled in the art, the fastener-engaging tips 24a and 24b and the generally cylindrical collar 30 may well be integral with the one end 42 of the shank 20. In the embodiment illustrated in the drawings, the shank 20 has been disclosed as having a hexagonal shape at least at the end 38 thereof which is to be inserted into a chuck to be driven by a rotary tool. Of course, it will be appreciated in this connection that this hexagonal shape is highly advantageous for the utilization of the wide variety of cordless portable electric rotary tools that are widely owned. However, as will also be appreciated, the shank 20 could be integral with a handle in normally conventional manual screwdriver fashion to provide a unique, improved manual removal tool.

As for other details, the collar 30 can be detachably secured to the fastener-engagement end 42 of the shank 20 in a wide variety of ways that will all be known and appreciated by those skilled in the tool designing field. It can simply be retained in place by sliding it onto the end 42 until the cap 44 is in abutment with the shoulder formed between the intermediate portion 40 and the end 42 wherein the mating non-circular shapes of the end 42 and the opening 46 are aligned to permit sliding movement of the collar 30 until it is in position following which the tool 10 can be placed over the fastener 12 in the prescribed manner. As a further refinement, the end 42 can be provided with a spring loaded ball detent for retaining the collar 30 in abutment with the shoulder formed between the intermediate portion 40 and the fastener-engagement end 42.

While in the foregoing there have been set forth preferred embodiments of the invention, it will be appreciated that the details herein given may be varied by those skilled in the art without departing from the true spirit and scope of the appended claims.

What is claimed is:

1. A tool for removing a one-way fastener of the type having a generally circular head with a flat upper surface portion and a convex upper surface portion, comprising:

a shank having an end to be placed in engagement with said head of said one-way fastener, said end of said shank having a pair of fastener-engaging tips extending therefrom for mating engagement with a corresponding pair of tip-receiving recesses in said head of said one-way fastener, a generally cylindrical collar surrounding said tips with an inner surface of a diameter substantially the same as the outer diameter of said generally circular head, and a plurality of continuous serrations about said inner surface of said cylindrical collar for gripping said head of said one-way fastener;

said continuous serrations being angled to bite into said head of said one-way fastener wherein each serration is non-symmetrical about a radial line passing through the axis of rotation of the collar.

2. The fastener removing tool of claim 1 wherein said fastener-engaging tips and said tip-receiving recesses have mating non-circular cross-sections.

3. The fastener removing tool of claim 1 wherein said fastener-engaging tips and said generally cylindrical collar are integral with said end of said shank.

4. The fastener removing tool of claim 1 wherein said shank has an end opposite said end to be placed in engagement with said fastener, said opposite end being adapted to be driven by a rotary tool for removing said one-way fastener.

5. The fastener removing tool of claim 1 wherein said cylindrical collar is detachably securable to said end of said shank to surround said tips upon demand.

6. A tool for removing a one-way fastener of the type having a generally circular head with a pair of flat upper surface portions and a pair of convex upper surface portions located generally in diametrically opposite quadrants, respectively, said tool comprising;

a shank having an end to be placed in engagement with said head of said one-way fastener, said end of said shank having a pair of symmetrically arranged fastener-engaging tips extending therefrom for mating engagement with a corresponding pair of symmetrically arranged tip-receiving recesses in said head of said one-way fastener, said tip-receiving recesses being located along a flat surface diameter portion of said head dividing one flat upper surface portion and adjacent convex upper surface portion from the other flat upper surface portion and adjacent convex surface portion, said end of said shank also having a generally cylindrical collar surrounding said symmetrically arranged fastener-engaging tips with an inner surface of said generally cylindrical collar having a diameter substantially the same as the outer diameter of said generally circular head, said generally cylindrical collar also having a lowermost peripheral edge generally coextensive with the lowermost ends of said fastener-engaging tips and an inner depth at least as great as the maximum height of said generally circular head of said one-way fastener, and a plurality of continuous serrations about said inner surface of said cylindrical collar for gripping said head of said one-way fastener:

said continuous serrations being angled to bite into said head of said one-way fastener wherein each serration is non-symmetrical about a radial line passing through the axis of rotation of the collar.

7. The fastener removing tool of claim 6 wherein said fastener-engaging tips and said tip-receiving recesses have mating non-circular cross-sections.

8. The fastener removing tool of claim 6 wherein said fastener-engaging tips and said generally cylindrical collar are integral with said one end of said shank.

9. The fastener removing tool of claim 6 wherein said shank has an end to be placed in engagement with said fastener, said opposite end being adapted opposite said end to be driven by a rotary tool for removing said one-way fastener.

10. The fastener removing tool of claim 6 wherein said cylindrical collar is detachably securable to said end of said shank to surround said tips upon demand.

11. A tool for removing a one-way fastener of the type having a generally circular head with a pair of flat upper surface portions and a pair of convex upper surface portions located generally in diametrically opposite quadrants, respectively, said tool comprising:

a shank having an end to be placed in engagement with said head of said one-way fastener, said end of said shank having a pair of symmetrically arranged fastener-engaging tips extending therefrom for mating engagement with a corresponding pair of symmetrically arranged tip-receiving recesses in said head of said one-way fastener, said tip-receiving recesses being located along a flat surface diameter portion of said head dividing one flat upper surface portion and adjacent convex upper surface portion from the other flat upper surface portion and adjacent convex surface portion, said end of said shank also having a generally cylindrical collar surrounding said symmetrically arranged fastener-engaging tips with an inner surface of said generally cylindrical collar having a diameter substantially the same as the outer diameter of said generally circular head, said generally cylindrical collar also having a lowermost peripheral edge generally coextensive with the lowermost ends of said fastener-engaging tips and an inner depth at least as great as the maximum height of said generally circular head of said one-way fastener, and means associated with said inner surface of said generally cylindrical collar for gripping said head of said one-way fastener;

said shank having an end opposite said end to be placed in engagement with said fastener, said opposite end being adapted to be driven by a rotary tool for removing said one-way fastener, and said gripping means including a plurality of continuous serrations about said inner surface of said generally cylindrical collar;

said continuous sedations being angled to bite into said head of said one-way fastener wherein each serration is non-symmetrical about a radial line passing through the axis of rotation of the collar.

12. The fastener removing tool of claim 11 wherein said fastener-engaging tips and said tip-receiving recesses have mating non-circular cross-sections.

13. The fastener removing tool of claim 11 wherein said fastener-engaging tips and said generally cylindrical collar are integral with said one end of said shank.

14. The fastener removing tool of claim 11 wherein said fastener-engagement end of said shank includes means for detachably securing said generally cylindrical collar thereto.

15. The fastener removing tool of claim 11 wherein said shank is hexagonal shaped at said opposite end to be driven by said rotary tool and has a generally cylindrical intermediate portion and said fastener-engaging tips comprise prongs extending from an extension of said generally cylindrical intermediate portion.

16. The fastener removing tool of claim 15 wherein said extension is non-circular in cross-section and smaller than said intermediate portion to form a shoulder therebetween and said generally cylindrical collar has a cap with an opening adapted to mate with said non-circular cross-section opposite said serrations.

* * * * *

UNITED STATES PATENT AND TRADEMARK OFFICE
CERTIFICATE OF CORRECTION

PATENT NO.    :   5,450,776
DATED         :   September 19, 1995
INVENTOR      :   KOZAK, Burton It is certified that error appears in the above-identified patent and that said Letters Patent is hereby corrected as shown below:

Column 6, line 57, replace "sedations" with --serrations--.

Signed and Sealed this

Nineteenth Day of December, 1995

Attest:

BRUCE LEHMAN

*Attesting Officer*      *Commissioner of Patents and Trademarks*